April 8, 1952  E. C. MOSS  2,592,316

GAUGE FOR MEASURING CURVED SURFACES

Filed July 12, 1946

INVENTOR
E. C. MOSS
BY
W.C. Parnell
ATTORNEY

Patented Apr. 8, 1952

2,592,316

UNITED STATES PATENT OFFICE 2,592,316

GAUGE FOR MEASURING CURVED SURFACES

Earl C. Moss, Westfield, N. J., assignor to Western Electric Company, Incorporated, New York, N. Y., a corporation of New York Application July 12, 1946, Serial No. 683,183

1 Claim. (Cl. 33—174)

This invention relates to a gauge and to a method of making the same, and more particularly to a gauge formed and adapted to gauge a spatially curved line element of a curved surface and to a method of constructing such a gauge.

In various arts, it is desirable to manufacture pluralities of identically similar articles having curved surfaces which must conform within narrowly prescribed limits to accurately predetermined dimensions and curvatures. For example, in some calculating machines, recording devices and control apparatuses, cam elements movable in two intersecting directions, are employed to compound two variable motions into a single resultant motion, such cams having doubly curved surfaces which must conform to particular mathematical function curves or families of curves in the two directions of the cam's motion. As another instance, there are the familiar screw propellers of marine and aviation arts. When to be used at high speeds and large powers, such propeller "wheels" must have the several blades of each wheel identically alike in form and dimension, especially as to curvatures of the driving faces of the blades and also of the leading faces. In standard type marine wheels, the driving faces are, except near the blade edges, true helicoidal surfaces, i. e. skew curved surfaces generated by the motion of a straight line, while the leading faces are so spatially curved as to contain no straight lines. As illustrated and disclosed in copending application, Serial No. 683,180, now Patent 2,470,636 filed of even date herewith by the present inventor, one method of gauging marine wheel blades may be to apply to the driving face, the leading face, or both, of a blade of the wheel, an arcuately linear edge gauge member, curved and formed to match the intersection of the blade with a cylindrical surface coaxial with the wheel. In a standard type wheel, this intersection on the driving face of a blade is a true helix, the trace of a point revolving at constant angular velocity about the axis of the wheel while advancing in the direction of the axis at constant linear velocity; but on the leading face the corresponding intersection is concave toward the driving face as well as concave toward the axis.

An object of the present invention is to provide a method of making an edge gauge to correspond to the spatially curvilinear intersection of a surface to be gauged with a predeterminedly dimensioned and located cylindrical surface.

A further object of the invention is to provide a simply constructed, accurate and durable edge gauge corresponding to the spatially curvilinear intersection of a surface to be gauged with a predeterminedly dimensioned and located cylindrical surface.

With the above and other objects in view, the invention may be illustratively embodied in the method of making an edge gauge to match the predetermined spatially curvilinear intersection of a surface to be gauged with a predetermined cylindrical surface intersecting the same, which method comprises steps of forming a gauge body with one face thereof matching the cylindrical surface, forming a plane templet to have a gauging edge matching the form of the intersection as contained in the cylindrical surface when the cylindrical surface is developed into a plane, conforming the templet to the cylindrical face of the body, and securing the conformed templet on the said face.

Other objects and features of the invention will appear from the following detailed description of one embodiment thereof taken in connection with the accompanying drawing in which the same reference numerals are applied to identical parts in the several figures, and in which Fig. 1 is a plan view of a gauge constructed in accordance with the present invention;

Figure 1:
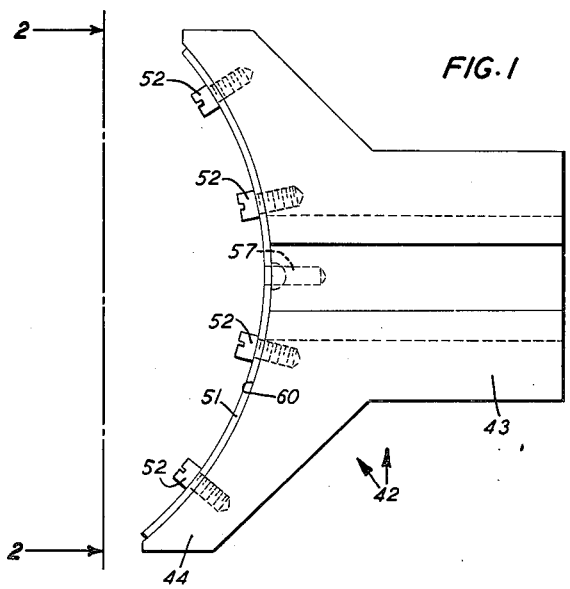
Figure 2:
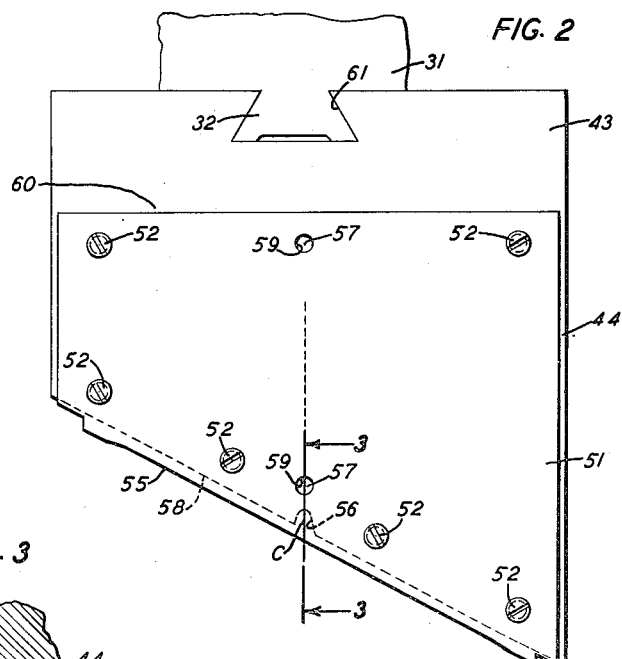
Fig. 2 is an elevation thereof taken on the line 2—2 of Fig. 1.

This application is one of a group of five applications, the other four being Serial Nos. 683,179, now Patent 2,564,789, 683,180, now Patent 2,470,636, 683,181, and 683,182, now Patent 2,568,817, filed of even date herewith by the same inventor, and all closely related because of disclosing and claiming various phases of one apparatus adaptable to different uses by inclusion, exchange or exclusion of parts. Each application discloses structure and features relevant to or constituent in inventions claimed in one or other of the other applications of the group. Hence, for convenience of reference among the several disclosures, the same reference numerals have been applied to identical parts in all the figures of the several sets of drawings. Applicant does not intend that patentable features disclosed but not claimed in any of the five applications shall thereby be dedicated to the public if claimed as well as disclosed in another application of the group.

The invention herein claimed is disclosed as embodied in a gauge, and a method of making it, particularly adapted to be used in the gauging apparatus disclosed and claimed in copending application Serial No. 683,179, now Patent 2,564,789, to which reference may be had for extended and detailed description of one use for which the gauge is intended, the present invention being limited to the structure of the gauge member and the method of making it herein described.

The edge gauge 42 herein disclosed comprises a relatively massive body having two integrally united arms, a horizontal arm 43 and a vertical arm 44. The horizontal arm is provided with means whereby the whole may be attached to a support 31, e. g. a female dovetail 61 to match a male dovetail 31 on the support as further described in copending application Serial No. 683,179 now Patent 2,564,789. The vertical arm 44 has its outer face formed to a cylindrically concave surface 60 (Fig. 1); and a gauge member proper 51, of sheet metal is secured and conformed to this cylindrical surface by means of screws 52 and is accurately positioned on the cylindrical surface 60 by means of locating pins 57 mounted in the arm 44 and entering accurately formed and located apertures 59 in the sheet 51. The bottom edge 55 of the cylindrically curved sheet 51 is accurately formed to correspond to the predetermined arcuate line of intersection of a surface to be gauged with a cylinder having the curvature of the cylindrical sheet 51. The bottom edge of the arm 44 is approximately parallel to the edge 55, and is spaced sufficiently above the edge 55 to allow the latter to be brought against the work without interference and yet as closely to the edge 55 as convenience will permit to allow the member 44 to have the greatest possible support for and control of the sheet 51.

For convenience in locating the edge 55 in a predetermined position on the work, the sheet 51 may be provided with locating indicia, e. g. a line C scribed vertically up on the outer face of the sheet from the mid point of the edge 55. Further, the bottom of the arm 44 may be bevelled, as at 53, for clearance, and notched, as at 56, to expose enough of the line C for easy visibility.

In making the gauge whose structure has just been described, the body 43, 44 is preparatorily formed and shaped. The cylindrical surface 60 of the arm 44 is shaped accurately to the predetermined cylindrical form necessary, of radius greater than the corresponding radius of the line to be gauged by thickness of the sheet 51; and the locating pins 57, 57 are set accurately in place.

The sheet 51 is rough cut to general size and shape from preferably elastic, flat stock. The gauging edge 55 is then accurately formed while the sheet is still flat, it being a relatively simple and easy matter to shape the edge of a piece of flat sheet stock accurately to any precalculated, pretraced or otherwise predetermined linear form in a plane. If desired, the whole sheet or a desired portion along the edge 55 may be tempered, case hardened or through hardened, for durability, during or after this forming, and honed if necessary. The accurately formed edge 55 having been thus created, the apertures 59 are located, drilled and reamed to be accurate in size and accurate in location with respect to the edge 55. The holes for the screws 52 are drilled a trifle oversize to let the pins 57 and apertures 59 govern the relative positions of the member 44 and plate 51 when assembled. The line C is scribed in correct relation to the apertures 59 and edge 55. The plate 51 is then curved and set to a curvature of slightly greater radius than the curvature of the cylindrical face 60 of the member 44, is positioned against that face on the pins 57, and is drawn snugly tight against the face by means of the screws 52.

It is to be noted that all the operations which result in the creation of the gauging edge 55 are performed on the sheet or plate 51 while this is flat. Other gauges of analogous kind in the prior art are integral, one piece, with the doubly curved gauging edge formed directly on the gauge body itself, an enormously difficult and time consuming operation as compared with the method of the invention which comprises essentially creating first a plane laminar templet having a singly curved linear gauging edge, and then curving the plane templet so formed and attaching it securely to the gauge body. By this method, only one curvature at a time has to be dealt with.

For simplicity of pictorial representation, an illustrative embodiment has been chosen in which the cylindrical curvature in the plane of Fig. 1 is that of a circular cylinder, while the curvature in the plane of the templet 51 while still flat is zero over a considerable part of the edge 55. The invention, however, is not so limited. The method is equally applicable whatever the guide curve of the cylindrical curvature shown in Fig. 1 may be, so only that it may be possible to draw the plate 51 snugly against it over its whole extent by means of the screws 52 or equivalent fastening means, and equally whatever may be the curvature of the edge 55 of the plate 51 when this is flat.

Figure 3:
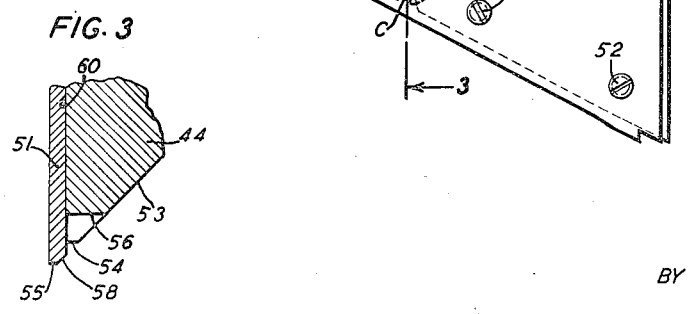
Fig. 3 is a broken enlarged, detail view in section on the line 3—3 of Fig. 2.

In the ensuing claim, phrases are worded as if the sheet or lamina 51 were of no thickness, as if the curvatures of the face 60 and of the edge 55 were identical. It would make the claim impossibly unwieldy if the radial difference of these curvatures due to the thickness of the member 51 were explicitly expressed in the claim; and therefore the claim is to be read as implicitly including this difference. Similarly, in speaking of the gauging edge 55 and of the curvature of this edge, the wording of the claim ignores the fact that the edge 55 is not the breadthless intersection of two faces, but is, in practice, the narrowly truncated intersection, as shown in Fig. 3.

What is claimed is:

An edge gauge for checking the contour of a curved surface at the curvilinear intersection of a given cylindrical surface therewith, said gauge comprising a flexible normally flat gauging element having one edge contoured to the planar development of the desired contour of the curved surface at the curvilinear intersection, a massive rigid body holding the normally flat element with its contoured edge flexed to the curvature of the cylindrical surface and rigidly supported close to the contoured edge, and means for mounting the gauge with the contoured edge aligned with the curvilinear intersection.

EARL C. MOSS.

REFERENCES CITED

The following references are of record in the file of this patent:

UNITED STATES PATENTS

| Number | Name | Date |
| --- | --- | --- |
| 397,132 | Kimball | Feb. 5, 1889 |
| 724,185 | Hughes | Mar. 31, 1903 |
| 1,647,707 | Mears | Nov. 1, 1927 |
| 2,000,528 | Linderman | May 7, 1935 |